US012356080B2

(12) United States Patent
Egashira et al.

(10) Patent No.: US 12,356,080 B2
(45) Date of Patent: Jul. 8, 2025

(54) VEHICLE RECOGNITION SYSTEM AND VEHICLE RECOGNITION METHOD

(71) Applicant: TOYOTA JIDOSHA KABUSHIKI KAISHA, Toyota (JP)

(72) Inventors: Kazuki Egashira, Susono (JP); Hiroya Chiba, Fuji (JP); Daisuke Kakuma, Susono (JP); Yuhei Oka, Susono (JP); Tatsuya Sugano, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/640,213

(22) Filed: Apr. 19, 2024

(65) Prior Publication Data
US 2024/0365010 A1 Oct. 31, 2024

(30) Foreign Application Priority Data

Apr. 28, 2023 (JP) ................ 2023-074642

(51) Int. Cl.
*H04N 23/72* (2023.01)
*G06V 10/20* (2022.01)
*H04N 23/71* (2023.01)
*H04N 23/73* (2023.01)
*H04N 23/76* (2023.01)

(52) U.S. Cl.
CPC ............ *H04N 23/72* (2023.01); *G06V 10/20* (2022.01); *H04N 23/71* (2023.01); *H04N 23/73* (2023.01); *H04N 23/76* (2023.01); *G06V 2201/08* (2022.01)

(58) Field of Classification Search
USPC ........................................... 348/143
See application file for complete search history.

(56) References Cited

U.S. PATENT DOCUMENTS

| 2011/0074957 | A1  | 3/2011  | Kiyohara et al. |         |
|--------------|-----|---------|-----------------|---------|
| 2019/0335079 | A1* | 10/2019 | Koizumi         | H04N 25/587 |
| 2019/0373170 | A1* | 12/2019 | Fujita          | H04N 23/695 |

FOREIGN PATENT DOCUMENTS

| JP | 2011-077772 A | 4/2011  |
|----|---------------|---------|
| JP | 2011-254340 A | 12/2011 |

* cited by examiner

*Primary Examiner* — Nigar Chowdhury
(74) *Attorney, Agent, or Firm* — Dinsmore & Shohl LLP

(57) ABSTRACT

In a recognition processing of a vehicle included in a camera image acquired by a camera installed in a closed space, the vehicle recognition system determines whether a shutter provided at an entrance/exit for a vehicle in the closed space is opened or not based on opening/closing information on the shutter. Then, the vehicle recognition system determines whether or not an outside illuminance is higher than an inside illuminance based on information on the outside illuminance and information on the inside illuminance. Furthermore, the vehicle recognition system performs brightness correction processing for correcting brightness of the camera image when it is determined that the shutter is opened and the outside illuminance is higher than the inside illuminance.

5 Claims, 5 Drawing Sheets

FIG. 3A

|  | BRIGHTNESS CORRECTION PROCESSING ||
|  | CAMERA PARAMETER ADJUSTMENT | CAMERA IMAGE CORRECTION |
| --- | --- | --- |
| CASE1 | ○ | — |
| CASE2 | — | ○ |
| CASE3 | ○ | ○ |

FIG. 3B

|  | OPENING DEGREE OF SHUTTER | BRIGHTNESS CORRECTION PROCESSING ||
|  |  | CAMERA PARAMETER ADJUSTMENT | CAMERA IMAGE CORRECTION |
| --- | --- | --- | --- |
| CASE1 | FIRST OPENING DEGREE (LESS THAN PREDETERMINED DEGREE) | — | — |
| CASE2 | SECOND OPENING DEGREE (EQUAL TO OR LARGER PREDETERMINED DEGREE) | ○ | — |
| CASE3 | SECOND OPENING DEGREE (EQUAL TO OR LARGER PREDETERMINED DEGREE) | — | ○ |
| CASE4 | THIRD OPENING DEGREE (EQUAL TO OR LARGER PREDETERMINED DEGREE) | ○ | ○ |

VEHICLE RECOGNITION SYSTEM AND VEHICLE RECOGNITION METHOD

CROSS-REFERENCE TO RELATED APPLICATION

The present application claims priority under 35 U.S.C. § 119 to Japanese Patent Application No. 2023-074642, filed on Apr. 28, 2023, the contents of which application are incorporated herein by reference in their entirety.

BACKGROUND

Technical Field

The present disclosure relates to a technique for recognizing a vehicle.

Background Art

JP 2011254340 A discloses an imaging device for improving visibility of a target person desired to be noticed by a user. The imaging device detects a face of the target person based on an image obtained by combining a low-illumination image and a high-illumination image captured by a camera. Then, the imaging device calculates a luminance distribution of a face area. Furthermore, the imaging device controls an exposure amount of the face area such that the exposure amount of the face area closes to an appropriate exposure range based on the luminance distribution of the face area of the person in a low or high illumination area.

SUMMARY

Consider a closed space (e.g., a garage, a parking lot, a factory, etc.) with a certain extent of space in which a vehicle is expected to move. And consider a scene in which a camera provided in the closed space recognizes a vehicle moving out of this closed space. When a shutter at an entrance/exit for a vehicle in the closed space is opened, depending on a weather around the closed space and a time of day, an amount of light received by a light-receiving sensor on a camera may be saturated, causing a white-out of a camera image. If the vehicle is included in the white-out area the camera image, the camera may not be able to recognize the vehicle.

An object of the present disclosure is to provide a technique capable of suppressing a decrease in a recognition accuracy of a vehicle included in the camera image when a shutter of a closed space is opened, during the vehicle moves out of the closed space.

A first aspect relates to a vehicle recognition system for recognizing a vehicle in a closed space. The vehicle recognition system includes a storage device that stores a camera image acquired by a camera installed in the closed space, opening/closing information on a shutter provided at an entrance/exit for a vehicle in the closed space, information on an inside illuminance indicating an illuminance in a shooting space of the camera inside the closed space, and information on an outside illuminance indicating an illuminance outside the closed space and a processor is configured to perform a recognition processing of a vehicle included in the camera image. The processor performs a recognition processing of a vehicle included in the camera image. In the recognition processing, the processor determines whether the shutter is opened or not based on the opening/closing information on the shutter. The processor determines whether or not the outside illuminance is higher than the inside illuminance based on the information on the outside illuminance and the information on the inside illuminance. The processor performs brightness correction processing for correcting brightness of the camera image when it is determined that the shutter is opened and the outside illuminance is higher than the inside illuminance.

A second aspect of the present disclosure further has the following features in addition to the first aspect. In the brightness correction processing, the processor corrects the brightness of the camera image by determining that the outside illuminance is higher than the inside illuminance if the outside illuminance is higher than the inside illuminance by a threshold value.

A third aspect of the present disclosure further has the following features in addition to the first aspect. The storage device further stores setting information on the camera including a shutter speed of the camera. The brightness correction processing includes at least one of processing for correcting brightness calculated from the camera image and processing for adjusting the shutter speed.

A fourth aspect of the present disclosure further has the following features in addition to the third aspect. The opening/closing information on the shutter includes information on a degree of opening/closing of the shutter. In the processing for correcting brightness calculated from the camera image, when the information on the degree of opening/closing of the shutter is included in the opening/closing information on the shutter, the processor sets a degree of correction of brightness according to the degree of opening/closing. In the processing for adjusting the shutter speed, the processor sets a degree of adjustment of the shutter speed according to the degree of opening/closing.

A fifth aspect of the present disclosure relates to a method for recognizing a vehicle in a closed space. The method includes:

in a recognition processing of a vehicle included in a camera image acquired by a camera installed in the closed space, determining whether a shutter provided at an entrance/exit for a vehicle in the closed space is opened or not based on opening/closing information on the shutter;

determining whether or not an outside illuminance is higher than an inside illuminance based on information on the outside illuminance and information on the inside illuminance; and performing brightness correction processing for correcting brightness of the camera image when it is determined that the shutter is opened and the outside illuminance is higher than the inside illuminance.

According to the present disclosure, if the shutter is opened the outside illuminance is higher than the inside illuminance, that is, in a situation where a white-out of the camera image may occur, brightness of the camera image is corrected.

BRIEF DESCRIPTION OF DRAWINGS

FIG. 3A is a diagram for explaining a specific example of the vehicle recognition system according to the embodiment;

FIG. 3B is a diagram for explaining a specific example of the vehicle recognition system according to the embodiment;

DESCRIPTION OF EMBODIMENT

Figure 1A:
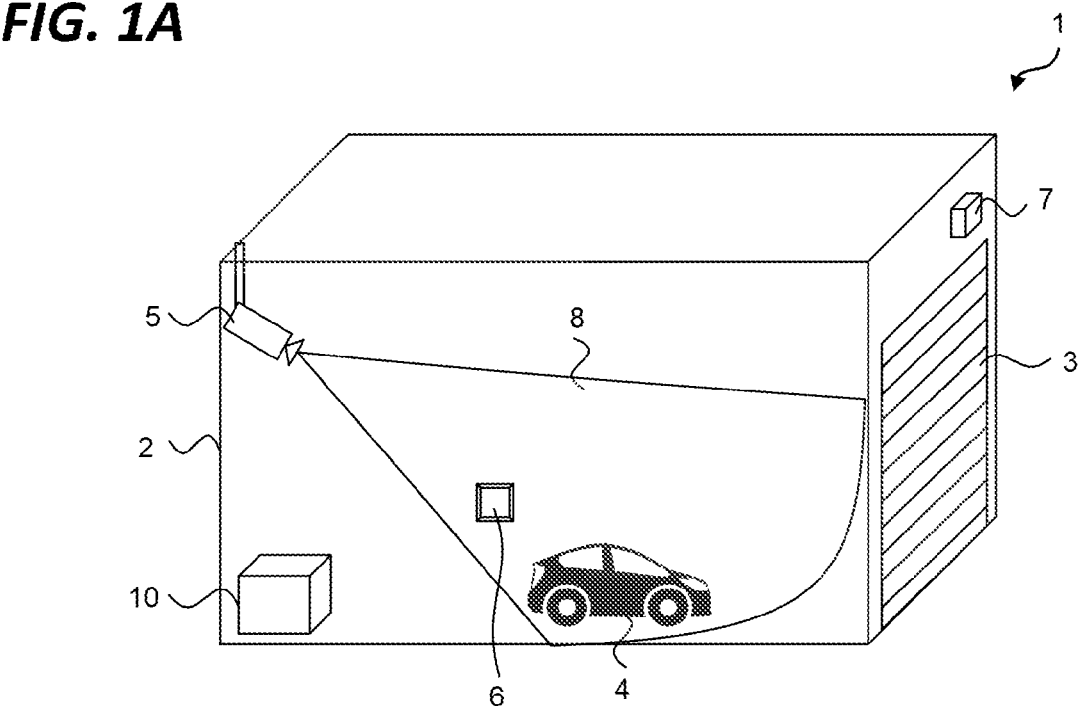
FIG. 1A is a diagram for explaining an outline of a vehicle recognition system according to an embodiment.

A vehicle recognition system and a vehicle recognition method according to an embodiment of the present disclosure will be described with reference to the accompanying drawings. In addition, the same reference numerals are given to the same elements in the drawings, and the overlapping description will be omitted.

1. OUTLINE

Figure 1B:
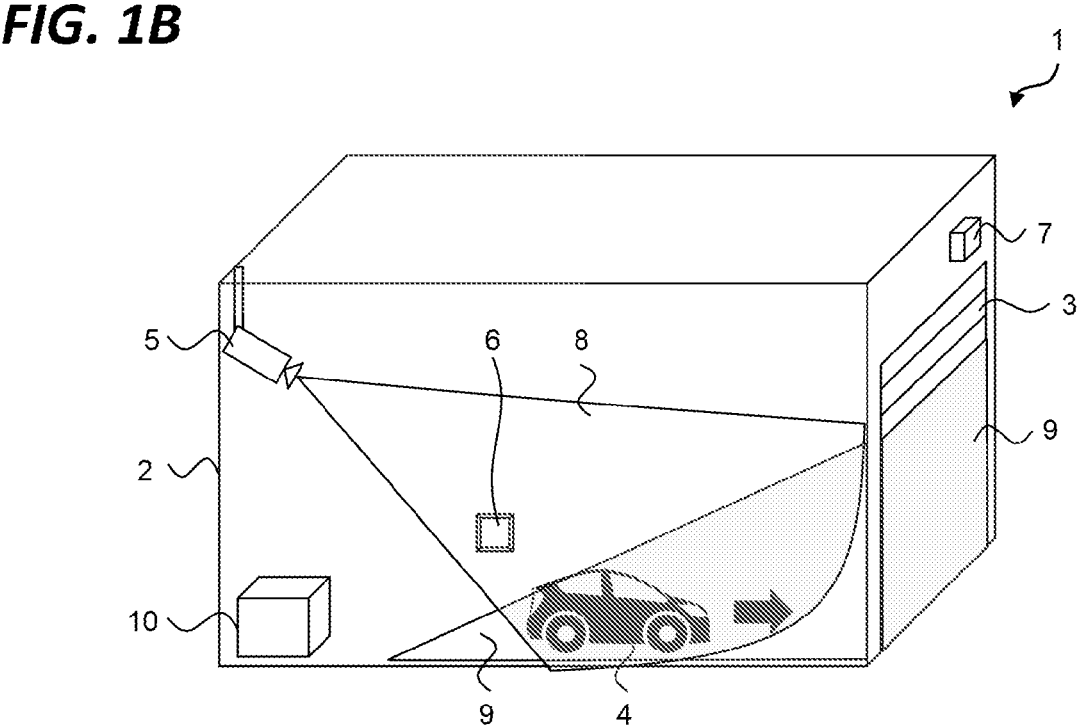
FIG. 1B is a diagram for explaining an outline of the vehicle recognition system according to the embodiment.

FIG. 1A and FIG. 1B is a diagram for explaining an outline of a vehicle recognition system 1 according to an embodiment. The vehicle recognition system 1 is a system that recognizes a vehicle 4 in a closed space 2 by using a camera 5 installed in the closed space 2. As shown in FIG. 1A, the vehicle recognition system 1 includes a camera 5, a first illuminance sensor 6, a second illuminance sensor 7, and an information processing device 10. The camera 5, the first illuminance sensor 6, and the information processing device 10 are all provided inside the closed space 2. The second illuminance sensor 7 is provided outside the closed space 2. The information processing device 10 may be provided outside the closed space 2.

The closed space 2 is a space having a certain extent in which a vehicle is assumed to move, such as a garage, a parking facility, or a factory. As shown in FIG. 1A, the closed space 2 is provided with at least one shutter 3 for connecting the inside of the closed space 2 and the outside of the closed space 2 for the entrance and exit of the vehicle 4. The shutter 3 has a structure that can be opened and closed in the vertical direction.

The camera 5 captures an image of the shooting space in the closed space 2. The shooting space means an angle of view 8 of the camera 5 set so that the vehicle 4 existing within a predetermined distance from the shutter 3 is included in the camera image captured by the camera 5. The camera 5 may have a zoom function so as to be able to capture an enlarged image of the vicinity of the vehicle 4.

The first illuminance sensor 6 is a sensor that acquires inside illuminance indicating illuminance in the shooting space of the camera 5. The first illuminance sensor 6 may be fixedly attached to any place in the shooting space of the camera 5, or may be attached to the vehicle 4 existing in the shooting space of the camera 5. In the example shown in FIG. 1A, the first illuminance sensor 6 is fixedly attached to the wall surface inside the closed space 2 in the shooting space of the camera 5.

The second illuminance sensor 7 is a sensor that acquires outside illuminance indicating illuminance outside the closed space 2. The second illuminance sensor 7 may be fixedly attached to the outside of the closed space 2 and near the shutter 3, or may be attached to a vehicle existing outside the closed space 2. In the example shown in FIG. 1A, the second illuminance sensor 7 is fixedly attached to the wall surface outside the closed space 2 and to the upper portion of the shutter 3.

The information processing device 10 is an apparatus that performs a recognition processing process of the vehicle 4 included in the camera image captured by the camera 5. The information processing device 10 is connected to the shutter 3, the camera 5, the first illuminance sensor 6, and the second illuminance sensor 7. The information processing device 10 and each device are connected by, for example, a cable. In a case where a communication device is provided in each device, the information processing device 10 may acquire various information via each of the communication devices provided in the respective devices.

Here, as shown in FIG. 1B, a case where the shutter 3 is opened to move the vehicle 4 from the inside of the closed space 2 to the outside of the closed space 2 is considered. In this case, a light 9 is incident on the inside of the closed space 2 from the entrance/exit connecting the inside of the closed space 2 and the outside of the closed space 2. When a reflected light of the light 9 incident on the inside of the closed space 2 is captured by the camera 5 in an amount equal to or greater than a predetermined amount, there is a possibility that white-out may occur in the camera image captured by the camera 5.

According to the vehicle recognition system 1 of the embodiment, the information processing device 10 performs the following process when the shutter 3 is opened. Specifically, the information processing device 10 determines whether or not the shutter 3 is opened. The determination as to whether or not the shutter 3 is opened is performed, for example, based on the opening/closing information on the shutter 3. The opening/closing information on the shutter 3 includes, for example, information of an opening/closing button (opening button or closing button) of the shutter 3.

Then, the information processing device 10 determines whether the outside illuminance is higher than the inside illuminance based on the information on the inside illuminance acquired by the first illuminance sensor 6 and the information on the outside illuminance acquired by the second illuminance sensor 7. The illuminance judgement processing of determining whether the outside illuminance is higher than the inside illuminance will be described in detail later.

Furthermore, when it is determined that the shutter 3 is opened and it is determined that the outside illuminance is higher than the inside illuminance, the information processing device 10 performs brightness correction processing for correcting the brightness of the camera image. The brightness correction processing will be described in detail later.

2. SPECIFIC EXAMPLE 2-1. Example of Illuminance Judgement Processing

Figure 2A:
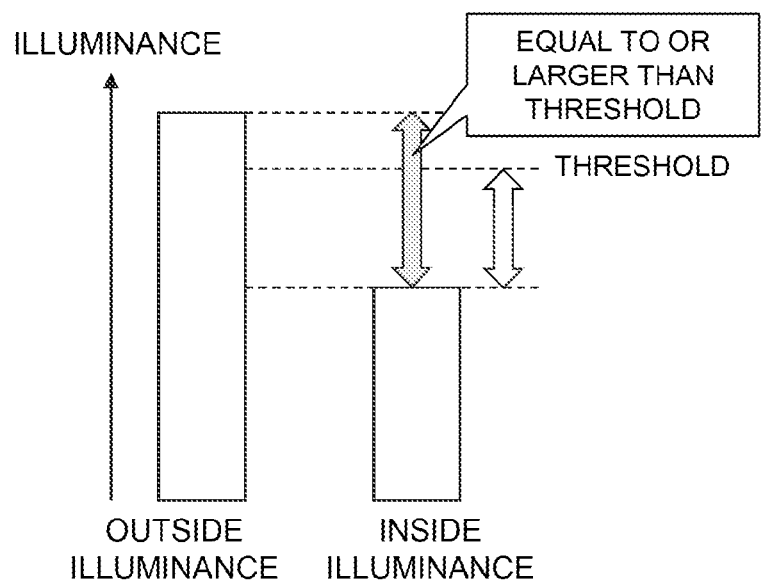
FIG. 2A is a diagram for explaining a specific example of the vehicle recognition system according to the embodiment.
Figure 2B:
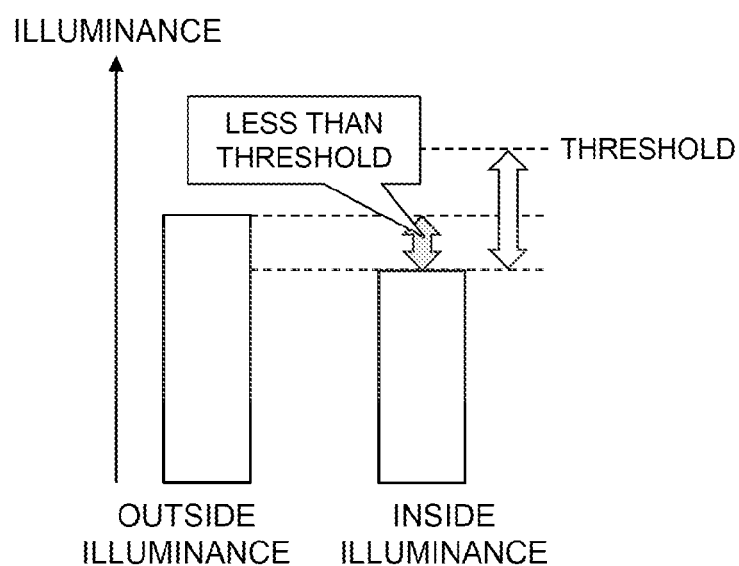
FIG. 2B is a diagram for explaining a specific example of the vehicle recognition system according to the embodiment.

FIG. 2A and FIG. 2B is a diagram for explaining a specific example of the vehicle recognition system 1 according to the embodiment. Specifically, FIG. 2A and FIG. 2B shows an example of illuminance judgement processing for determining whether or not the outside illuminance is higher than the inside illuminance when the shutter 3 is opened. In the example shown in FIG. 2A, it is shown that the outside illuminance is higher than the inside illuminance, and the difference between the outside illuminance and the inside illuminance is equal to or larger than the threshold. In this case, since the difference between the outside illuminance and the inside illuminance is large, it can be said that the camera image is in a state where white-out can occur.

On the other hand, in the example shown in FIG. 2B, it is shown that the outside illuminance is higher than the inside illuminance, but the difference between the outside illuminance and the inside illuminance is less than the threshold value. In this case, since the difference between the outside illuminance and the inside illuminance is small, it can be said that the camera image is not in a situation where white-out can occur.

Therefore, the information processing device 10 corrects the brightness of the camera image when the shutter 3 is opened and the outside illuminance is higher than the inside illuminance by a threshold or more.

2-2. Example of Brightness Correction Processing

FIG. 3A and FIG. 3B is a diagram for explaining a specific example of the vehicle recognition system 1 according to the embodiment. Specifically, FIG. 3A and FIG. 3B shows an example of brightness correction processing for correcting the brightness of a camera image executed by the information processing device 10. In the example shown in FIG. 3A, the brightness correction processing includes two of parameter adjustment of the camera 5 and correction of the camera image. The contents of the respective processes will be described below.

The parameter adjustment of the camera 5 is performed based on the setting information of the camera 5. The setting information on the camera 5 includes information on the shutter speed of the camera 5. That is, the parameter adjustment of the camera 5 means adjustment of the shutter speed of the camera 5. For example, in a situation where white-out of a camera image may occur, the set value of the shutter speed of the camera 5 is adjusted so as to increase the shutter speed of the camera 5. This makes it possible to suppress the amount of reflected light of the light 9 taken into the camera 5. Therefore, the situation in which the white-out of the camera image may occur is improved.

Next, correction of a camera image will be described. The correction of the camera image is performed based on the brightness calculated from the camera image. That is, when the brightness calculated from the camera image is equal to or higher than the reference value, it can be said that the camera image is in a situation where the white-out can occur. Therefore, by correcting the brightness of the camera image so that the brightness is less than the reference value, the situation in which the white-out of the camera image may occur is improved.

As shown in FIG. 3A, the brightness correction process may include at least one of a processing of adjusting the shutter speed of the camera 5 and a processing of correcting the brightness calculated from the camera image. In the example shown in case 1 of FIG. 3A, the brightness correction processing includes only processing for adjusting the shutter speed of the camera 5. In the example shown in case 2 of FIG. 3A, the brightness correction processing includes only a processing of correcting the brightness calculated from the camera image. In the example shown in case 3 of FIG. 3A, the brightness correction processing includes processing for adjusting the shutter speed of the camera 5 and processing for correcting the brightness calculated from the camera image.

Further, the information processing device 10 may determine the execution content of the brightness correction processing according to a degree of opening/closing of the shutter 3 as shown in FIG. 3B. The degree of opening/closing of the shutter 3 is expressed by a percentage using the position of the lowermost portion (for example, the water drip) of the shutter 3, for example. For example, the lowermost position when the entrance is completely closed by the shutter 3 is set to 0%, and the lowermost position when the entrance is completely opened by the shutter 3 is set to 100%. The degree of opening is thereby expressed in percentage. This concept of the opening degree can also be applied to the closing degree (closing degree=100−opening degree).

The opening degree of the shutter 3 is calculated based on, for example, information on the speed at which the shutter 3 is opened and information on the opening button of the shutter 3 included in the opening/closing information of the shutter 3. Specifically, it is assumed that the speed at which the shutter 3 opens is constant and is known information. In this case, the opening degree of the shutter 3 is calculated based on the speed and the time zone from when the open button of the shutter 3 is enabled to when the open button is disabled. Thus, the opening degree of the shutter 3 is obtained. The concept of calculating the opening degree can also be applied to the calculation of the closing degree of the shutter 3.

The opening degree of the shutter 3 is classified into three opening degrees, that is, a first opening degree, a second opening degree, and a third opening degree, for example, as shown in FIG. 3B. The first opening degree means a state where the opening degree of the shutter 3 is less than a predetermined degree. The second opening degree means a state in which the opening degree of the shutter 3 is equal to or larger than a predetermined degree. The third opening degree means a state where the opening degree of the shutter 3 is equal to or larger than the predetermined degree and the opening degree of the shutter 3 is larger than the second opening degree.

In the example shown in case 1 of FIG. 3B, the opening degree of the shutter 3 is the first opening degree. In this case, since the camera image is not in a state in which white-out may occur, the information processing device 10 does not execute the brightness correction processing.

In the examples shown in case 2 and case 3 of FIG. 3B, the opening degree of the shutter 3 is the second opening degree. In this case, since the camera image is in a state in which the white-out may occur, the information processing device 10 performs the brightness correction processing. However, when the opening degree of the shutter 3 is the second opening degree, the situation in which the white-out of the camera image may occur is improved by executing either one of the processing of adjusting the shutter speed of the camera 5 included in the brightness correction processing and the process of correcting the brightness calculated from the camera image. Therefore, in the example of case 2 in FIG. 3B, the information processing device 10 executes processing for adjusting the shutter speed of the camera 5. On the other hand, in the example of case 3 of FIG. 3B, the information processing device 10 executes processing for correcting the brightness calculated from the camera image.

In the example shown in case 4 of FIG. 3B, the opening degree of the shutter 3 is the third opening degree. In this case, since the camera image is in a state in which the white-out may occur, the information processing device 10 performs the brightness correction processing. However, when the opening degree of the shutter 3 is the third opening degree, it is assumed that the white-out of the camera image are not eliminated even when either one of the processing of adjusting the shutter speed of the camera 5 and the processing of correcting the brightness calculated from the camera image is executed. Therefore, the information processing device 10 may execute both processing described above when the opening degree of the shutter 3 is the third opening degree.

The concept of the brightness correction processing according to the opening degree of the shutter 3 described with reference to FIG. 3B can also be applied to the brightness correction processing according to the closing degree of the shutter 3.

3. EFFECT

As described above, in the vehicle recognition system 1 according to the embodiment, when the shutter 3 is opened and the outside illuminance is higher than the inside illuminance, that is, when the camera image is in a state where white-out may occur, the brightness correction processing of correcting the brightness of the camera image is executed. In the brightness correction processing, at least one of processing for adjusting the shutter speed of the camera 5 and processing for correcting the brightness calculated from the camera image is executed. This can suppress a decrease in the accuracy of recognition of the vehicle 4 based on the camera image including the vehicle 4 exiting from the closed space 2 when the shutter 3 is opened.

4. CONFIGURATION EXAMPLE

Figure 4:
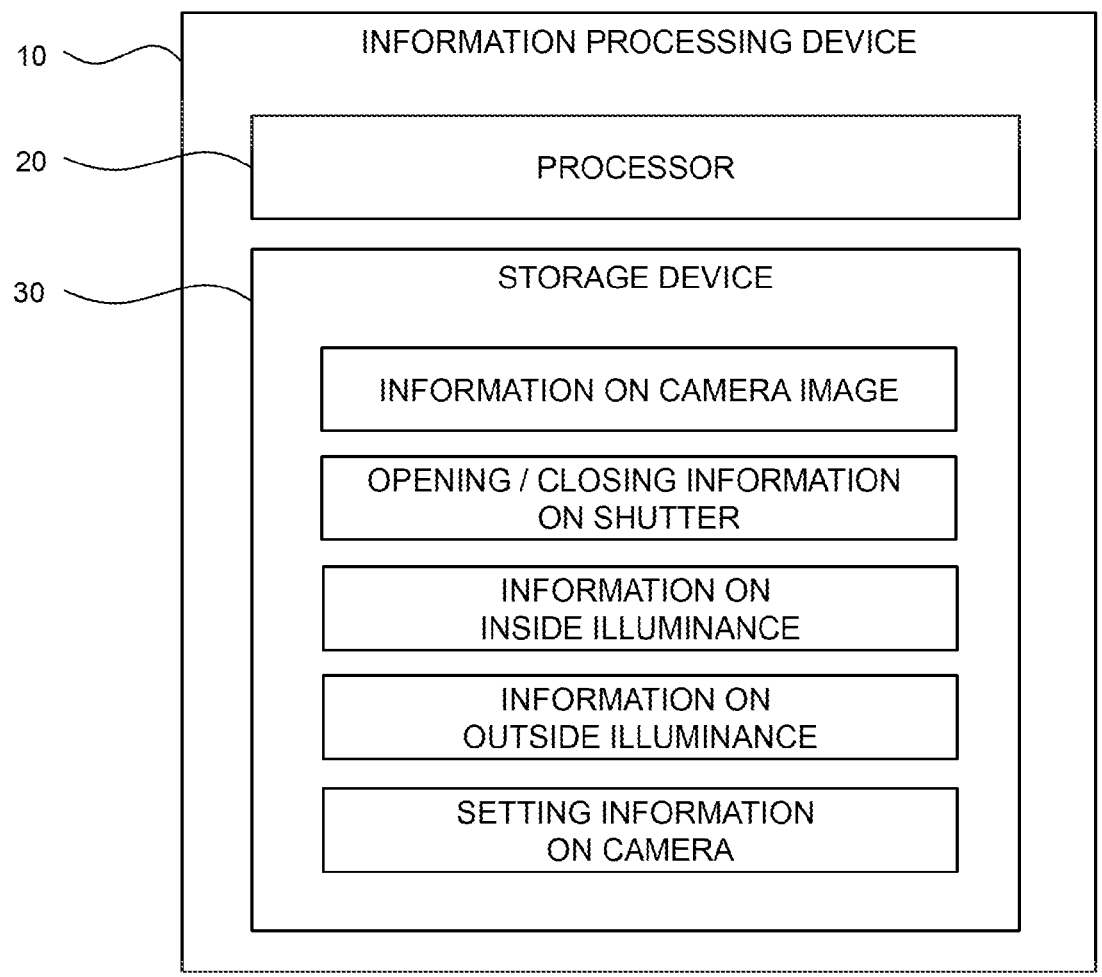
FIG. 4 is a block diagram showing an example of the configuration of the vehicle recognition system according to the embodiment.

FIG. 4 is a block diagram showing an example of the configuration of the information processing device 10 in the vehicle recognition system 1 according to the embodiment. The information processing device 10 includes a processor 20 and a storage device 30. The processor 20 executes various processes. The storage device 30 stores various kinds of various information necessary for processing by the processor 20.

The various information stored in the storage device 30 includes information of the camera image, opening/closing information of the shutter 3, information of the inside illumination, information of the outside illumination, and setting information on the camera 5. The opening/closing information on the shutter 3 includes information on the opening/closing button of the shutter 3 and information on the degree of opening/closing of the shutter 3. The setting information on the camera 5 includes information on the shutter speed of the camera 5.

The storage device 30 further includes a vehicle-recognition program (not shown). The vehicle recognition program is a computer program executed by the processor 20. The processor 20 executes the vehicle recognition program, thereby realizing the functions of the vehicle recognition system 1.

Note that the connection between the information processing device 10 and the various sensors including the camera 5, the first illuminance sensor 6, and the second illuminance sensor 7 may be a cable (first connection), or may be communication via a communication device provided in the various sensors (second connection). In a case where the connection between the various sensors and the information processing device 10 is the second connection, the information processing device 10 further includes a communication device capable of communicating with each sensor.

5. PROCESSING EXAMPLE

Figure 5:
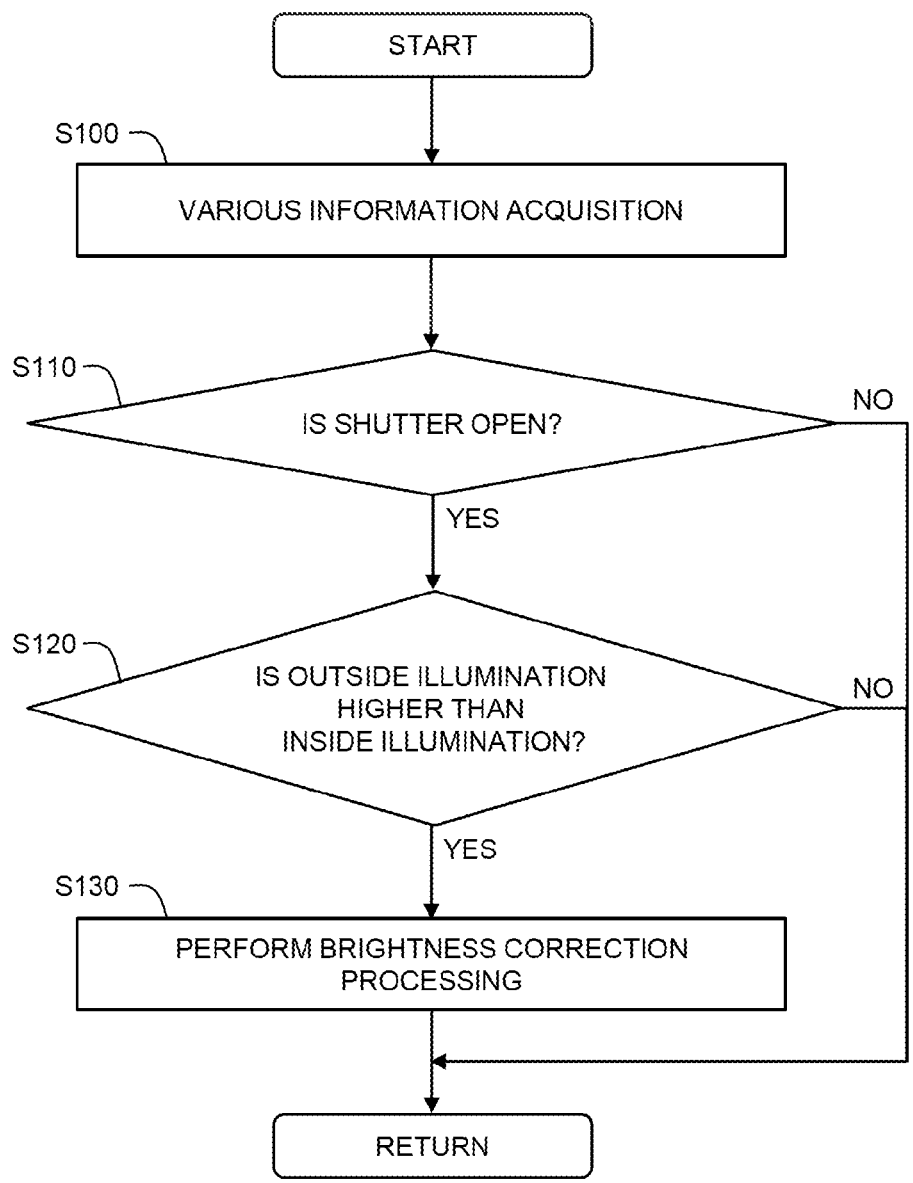
FIG. 5 is a flowchart showing an example of processing of the vehicle recognition system according to the embodiment.

FIG. 5 is a flowchart showing an example of processing performed by the information processing device 10 in the vehicle recognition system 1 according to the embodiment.

In step S100, the information processing device 10 acquires various information. Thereafter, the process proceeds to step S110. The various information includes information on the camera image, the opening/closing information of the shutter 3, the information on inside illuminance, the information on outside illuminance, and the setting information on the camera 5.

In step S110, the information processing device 10 determines whether the shutter 3 is opened or not based on the opening/closing information on the shutter 3. When it is determined that the shutter 3 is opened (Yes in Step S110), the process proceeds to Step S120. Otherwise (step S110; No), the process is terminated.

In step S120, the information processing device 10 determines whether the outside illumination is higher than the inside illumination based on the information on the outside illumination and the information on the inside illumination. When it is determined that the outside illumination is higher than the inside illumination (Yes in Step S120), the process proceeds to Step S130. Otherwise (step S120; No), the process is terminated.

In step S130, when it is determined that the shutter 3 is opened and the outside illumination is higher than the inside illumination, the information processing device 10 executes the brightness correction processing of the camera image. The brightness correction processing includes at least one of processing for adjusting the shutter speed of the camera 5 and processing for correcting the brightness calculated from the camera image.

What is claimed is:

1. A vehicle recognition system for recognizing a vehicle in a closed space, the vehicle recognition system comprising:
    a storage device that stores a camera image acquired by a camera installed in the closed space, opening/closing information on a shutter provided at an entrance/exit for a vehicle in the closed space, information on an inside illuminance indicating an illuminance in a shooting space of the camera inside the closed space, and information on an outside illuminance indicating an illuminance outside the closed space; and
    a processor is configured to perform a recognition processing of a vehicle included in the camera image,
    wherein, in the recognition processing, the processor is configured to:
    determine whether the shutter is opened or not based on the opening/closing information on the shutter;
    determine whether or not the outside illuminance is higher than the inside illuminance based on the information on the outside illuminance and the information on the inside illuminance; and
    perform brightness correction processing for correcting brightness of the camera image when it is determined that the shutter is opened and the outside illuminance is higher than the inside illuminance.

2. The vehicle recognition system according to claim 1, wherein, in the brightness correction processing, the processor is configured to correct the brightness of the camera image by determining that the outside illuminance is higher than the inside illuminance if the outside illuminance is higher than the inside illuminance by a threshold value.

3. The vehicle recognition system according to claim 1,
wherein the storage device further stores setting information on the camera including a shutter speed of the camera,
wherein the brightness correction processing includes at least one of processing for correcting brightness calculated from the camera image and processing for adjusting the shutter speed.

4. The vehicle recognition system according to claim 3,
wherein the opening/closing information on the shutter includes information on a degree of opening/closing of the shutter,
wherein the processor is configured to:
in the processing for correcting brightness calculated from the camera image, when the information on the degree of opening/closing of the shutter is included in the opening/closing information on the shutter, set a degree of correction of brightness according to the degree of opening/closing; and
in the processing for adjusting the shutter speed, set a degree of adjustment of the shutter speed according to the degree of opening/closing.

5. A vehicle recognition method for recognizing a vehicle in a closed space, the method comprising:
in a recognition processing of a vehicle included in a camera image acquired by a camera installed in the closed space, determining whether a shutter provided at an entrance/exit for a vehicle in the closed space is opened or not based on opening/closing information on the shutter;
determining whether or not an outside illuminance is higher than an inside illuminance based on information on the outside illuminance and information on the inside illuminance; and
performing brightness correction processing for correcting brightness of the camera image when it is determined that the shutter is opened and the outside illuminance is higher than the inside illuminance.

* * * * *